Sept. 29, 1936.     J. T. TRUMBLE     2,056,059
CLUTCH
Filed Sept. 6, 1934     2 Sheets-Sheet 2
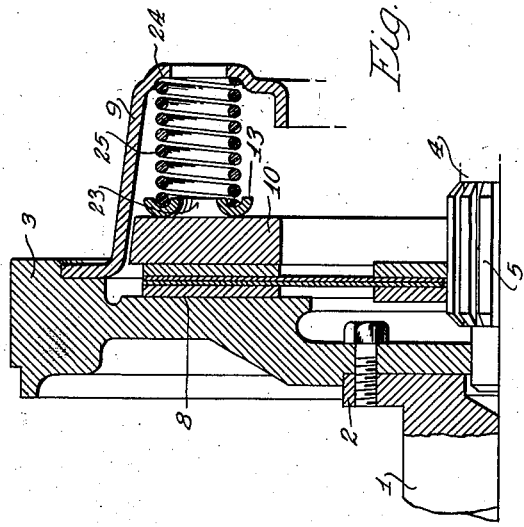
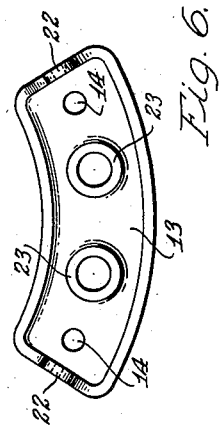
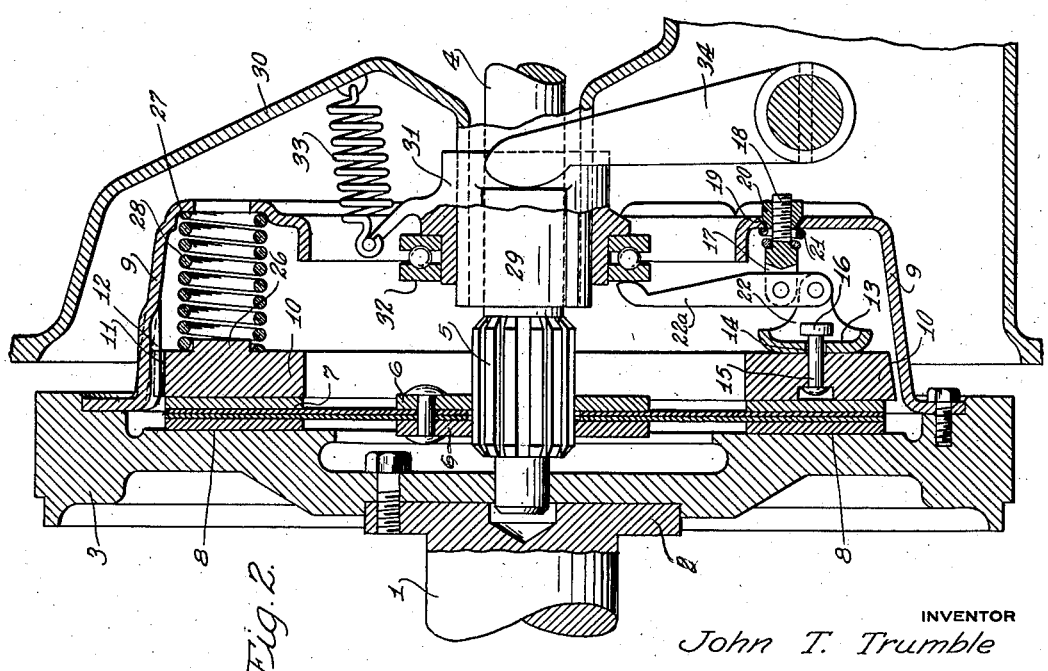
INVENTOR
John T. Trumble
BY
ATTORNEYS Patented Sept. 29, 1936

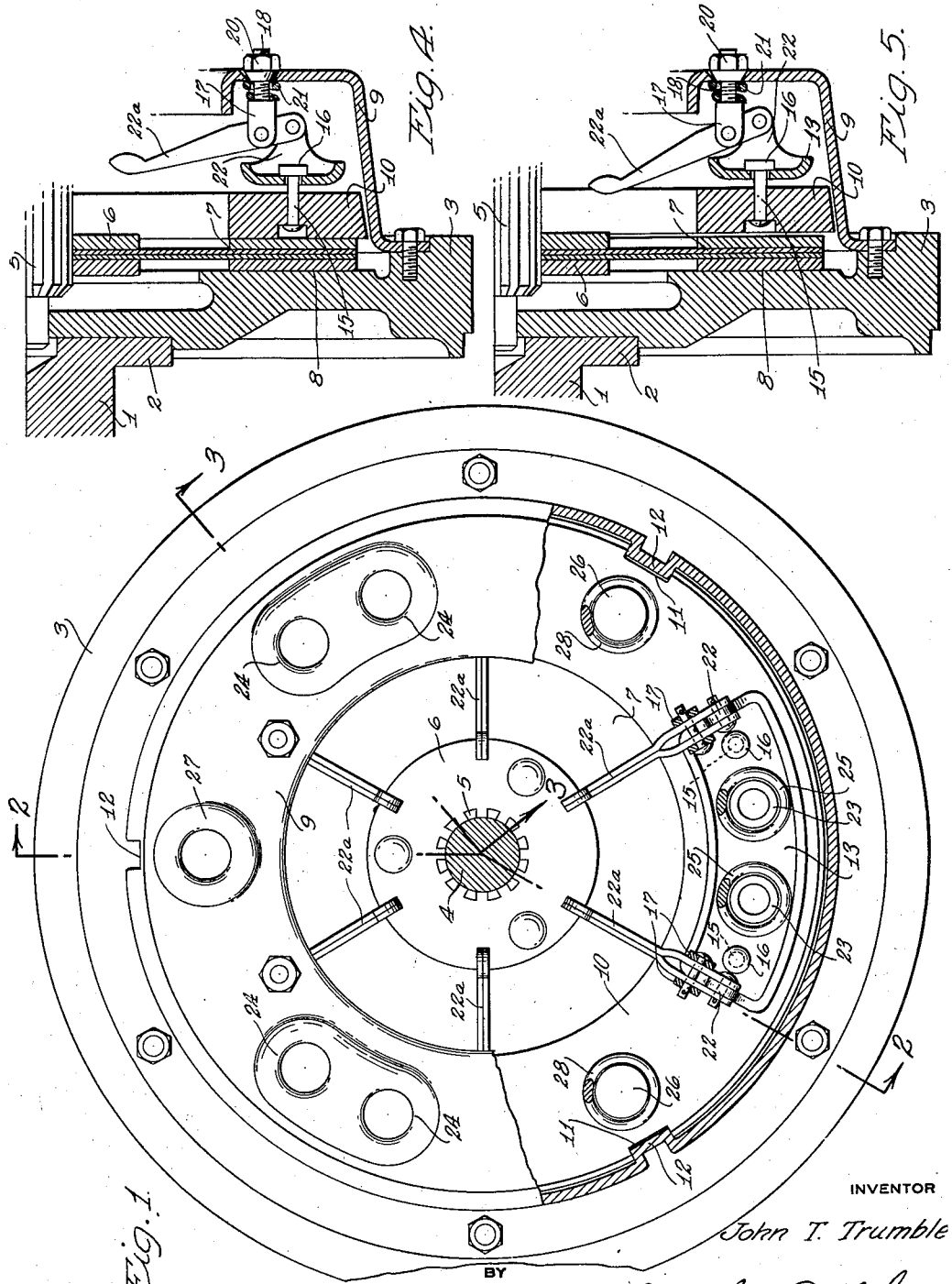

2,056,059

UNITED STATES PATENT OFFICE 2,056,059

CLUTCH

John T. Trumble, Detroit, Mich.

Application September 6, 1934, Serial No. 742,899

8 Claims. (Cl. 192—52)

The present invention pertains to a novel clutch of a type particularly adapted for automotive vehicle use.

Conventional automotive vehicle clutches ordinarily comprise friction disks, which when moved and held in contact one with the other, establish a driving connection between a driving and a driven part. The disks are ordinarily moved into and held in frictional contact by resilient means, such as coiled springs, and are positively moved out of engagement by levers. The levers are positively moved, either by a foot pedal or a power actuator, and the arrangement and construction of the levers are such that in the absence of pressure thereon, by the foot pedal or power actuator as the case may be, the resilient means causes the friction disks to become engaged. This invention aims to provide an auxiliary clutch disk engaging means in the form of resilient elements, such as coiled springs, to cause the friction disks to be moved to a position of initial engagement prior to receiving the engagement causing thrust of the main clutch engaging means. Generally speaking, means for performing such a function is disclosed in my prior application filed February 16, 1934, Serial No. 711,454 and this invention constitutes an improvement over my prior invention inasmuch as it provides for a less expensive and more easily assembled structure.

With the above and other ends in view reference is had to the accompanying drawings, in which Figure 1 is an end elevation of the present clutch with parts thereof broken away and in cross section;

Figs. 2 and 3 are cross sections taken respectively on lines 2—2 and 3—3 of Fig. 1;

Figs. 4 and 5 are fragmentary cross sections illustrating different stages in the operation of the device; and Fig. 6 is an elevation of a detail.

With reference to the drawings the numeral 1 designates a power or drive shaft having a flanged end 2 to which a fly wheel 3 is secured. A driven shaft 4 has a splined end 5 disposed adjacent to the flywheel 3 and mounted on the splines 5 are hub members 6 supporting a friction disk 7 in a position to cooperate with a drive face 8 on the flywheel. Secured to the flywheel 3 is an annular casing 9 in which is slidably received a pressure ring 10. The pressure ring 10 is formed with a plurality of grooves 11 receiving tongues 12 on the annular casing 9 to permit sliding movement of the pressure ring while preventing rotation thereof relative to the annular casing and the flywheel 3.

Secured to the pressure ring 10 are a plurality of plates 13, each plate being provided with a pair of spaced apart apertures 14 through which securing elements 15 extend. The securing elements 15 are provided with heads 16 which are spaced from the outer surface of the plates 13, as clearly shown in Fig. 2, to permit a limited amount of movement of the plate relative to the pressure ring. The apertures 14 are formed of a diameter greater than the elements 15, as shown in the drawings, so as to allow a comparatively small amount of lateral play between the plates 13 and the pressure ring 10.

Forked elements 17 are each provided with a screwthreaded stem 18 extending through an aperture 19 in the annular casing 9 and a conical nut 20 is provided on the stem to limit its movement relative to the annular casing 9. Sleeved on the stem 18 between the fork 17 and the annular casing 9 is a compressed coil spring 21 which tends to center the nut 20 relative to the opening 19 and thus to maintain the stem 18 and fork 14 projecting outwardly perpendicular to the portion of the casing 9 in which the particular aperture 19 is formed. Fulcrumed in each fork 17 is a lever 22a and each lever has one end pivotally connected to an ear 22 on a plate 13 and its other free end extending toward the driven shaft 4. It will be observed, with reference more particularly to Fig. 1, that there is a lever 22a and ear 22 provided at each end of each plate 13.

The plates 13 are each struck up at two spaced apart points to provide spring centering elements 23. In direct alignment with the spring centering elements 23 the annular casing 9 is provided with spring centering depressions 24 and a coiled spring 25 is interposed between the aligned sets of centering means 23 and 24, the springs 25 being in a compressed condition whereby the energy stored therein tends to thrust the plates 13 against the pressure ring 10 so that the disk 7 becomes tightly interposed between the pressure ring 10 and the drive surface 8.

The pressure ring 10 is provided with a plurality of spring centering elements 26 and in alignment therewith the annular casing 9 is provided with spring centering depressions 27. Received in each set of spring centering means 26 and 27 is a compressed coiled spring 28, there being three of such springs in the illustrated embodiment whereas there are six springs 25. It is obvious, however, that the number of springs may be varied but it is desirable that the combined thrust of the springs 25 be greater than the combined thrust of the springs 28.

Slidably mounted on a tubular part 29 on a clutch housing 30 through which the shaft 4 extends is a sleeve 31 carrying thrust bearings 32. The free ends of levers 22a are adapted to engage or be engaged by the bearings 32. A spring 33 has one end connected to the sleeve 31 and its other end connected to the housing 30, the spring 33 being under tension so as to urge movement of the sleeve 31 in a direction away from the levers 22a. A conventional clutch throw 34 is mounted in the housing 30 and inasmuch as means for operating clutch throws are well known to those versed in the art, no particular means has been shown for operating the same.

With the parts in the position shown in Fig. 2 the levers 22a are positioned so that the springs 25 force the plates 13 against the pressure ring 10 and the pressure exerted by these springs is combined with the pressure exerted by springs 28 in tightly interposing the friction disk 7 between the drive surface 8 and the pressure ring. A frictional driving connection is thus established between the shafts 1 and 4.

When the clutch throw 34 is moved so as to move sleeve 31 in a direction toward the flywheel 3 the levers 22a are rocked from the position shown in Fig. 2 to that shown in Fig. 5, in which position the plates 13 engage the heads 16 and move the pressure ring 10 in a direction away from the flywheel 3. The springs 25 and 28 are thus compressed and the driving connection between shafts 1 and 4 is broken.

When the sleeve 31 is moved in a direction away from the flywheel 3 the pressure of springs 25 and 28 moves the plates 13 and pressure ring 10 respectively toward the flywheel 3 and thus cause the levers 22a to pivot. As shown in Fig. 4 the springs 28 cause the pressure ring 10 to travel in advance of the plates 13, and at the stage shown the pressure ring is held in contact with the friction disk 7. Continued movement of the levers 22a permits the plates 13 to be moved, by springs 25, into engagement with the pressure ring, and the pressure of springs 25 is at this time added to the pressure of springs 28 in forcing the pressure ring into engagement with the friction disk. Accordingly it becomes obvious that the function of springs 25 is to cause clutch engagement in the usual manner and the function of springs 28 is to cause an initial clutch engagement in advance of the function of the springs 25.

Although a specific embodiment of the present invention has been illustrated and described it will be understood that various changes may be made within the scope of the appended claims without departing from the spirit of the invention, and such changes are contemplated.

What I claim is:—

1. In a clutch having a movable pressure member for causing clutch engagement and an axially fixed member, yieldable pressure means interposed between said pressure member and said axially fixed member, a plurality of plates, means for securing said plates in a circular series around the face of said pressure member and in a manner permitting a limited amount of movement of the plates with respect to the pressure member, yieldable pressure means interposed between said plates and said axially fixed member, levers pivotally supported on said axially fixed member, and means for connecting one end of each lever to one of said plates.

2. In a clutch having a movable pressure member for causing clutch engagement and an axially fixed member, yieldable pressure means interposed between said pressure member and said axially fixed member, arcuate elements, means for securing said arcuate elements to said pressure member in a circular series, said means being adapted to permit a limited amount of movement of said elements with respect to said pressure member, levers pivotally supported intermediate their ends on said axially fixed member, and means connecting one end of each lever to one of said arcuate elements.

3. In a clutch having a movable pressure member for causing clutch engagement and an axially fixed member, yieldable pressure means interposed between said pressure member and said axially fixed member, a plurality of plates, means for securing said plates in a circular series around the face of said pressure member and in a manner permitting a limited amount of movement of the plates with respect to the pressure member, yieldable pressure means interposed between said plates and said axially fixed member, levers pivotally supported on said axially fixed member, and means for connecting one end of a lever to each end of said plate.

4. In a clutch having a movable pressure member for causing clutch engagement and an axially fixed member, yieldable pressure means interposed between said pressure member and said axially fixed member, arcuate elements, means for securing said arcuate elements to said pressure member in a circular series, said means being adapted to permit a limited amount of movement of said elements with respect to said pressure member, levers pivotally supported intermediate their ends on said axially fixed member, and means for connecting one end of a pair of said levers to each arcuate element with one lever on each side of the yieldable pressure means associated with each arcuate element.

5. In a clutch having a movable pressure member adapted to cause clutch engagement and an axially fixed member, yieldable pressure means interposed between said pressure member and said axially fixed member, a plurality of plates, pins secured to said pressure member and extending through apertures in said plates, said pins having heads disposed to permit relative movement between said plates and pressure member, yieldable pressure means interposed between said plates and said axially fixed member, levers pivotally mounted on said axially fixed member, and means connecting one end of each lever to one of said plates.

6. In a clutch having a movable pressure member adapted to cause clutch engagement and an axially fixed member, yieldable pressure means interposed between said pressure member and said axially fixed member, a plurality of plates, pins secured to said pressure member and extending through apertures in said plates, said pins having heads disposed to permit relative movement between said plates and pressure member, said apertures being of a greater diameter than said pins whereby to permit lateral movement of the plates with respect to said pressure member, yieldable pressure means interposed between said plates and said axially fixed member, levers pivotally mounted on said axially fixed member, and means connecting one end of each lever to one of said plates.

7. In a clutch having a movable pressure member adapted to cause clutch engagement and an axially fixed member, yieldable pressure means interposed between said pressure member and said axially fixed member, a plurality of plates, pins secured to said pressure member and extending through apertures in said plates, said pins having heads disposed to permit relative movement between said plates and pressure member, yieldable pressure means interposed between said plates and said axially fixed member, levers having one end connected to said plates, a fulcrum for each lever, and yieldable means for supporting said fulcrums with respect to said axially fixed member.

8. In a clutch having a movable pressure member adapted to cause clutch engagement and an axially fixed member, yieldable pressure means interposed between said pressure member and said axially fixed member, a plurality of plates, pins secured to said pressure member and extending through apertures in said plates, said pins having heads disposed to permit relative movement between said plates and pressure member, yieldable pressure means interposed between said plates and said axially fixed member, levers connected to said plates, means for pivotally supporting said levers on said axially fixed member, said last named means being movable with respect to said axially fixed member, and resilient pressure means opposing movement of said last named means with respect to said axially fixed member.

JOHN T. TRUMBLE.